United States Patent [19]
Proper et al.

[11] 3,854,605
[45] Dec. 17, 1974

[54] ARTICLE CONVEYING

[75] Inventors: Davis S. Proper, Arvada; William J. Rueger, Longmont, both of Colo.

[73] Assignee: International Business Machines Corporation, Armonk, N.Y.

[22] Filed: Feb. 25, 1974

[21] Appl. No.: 445,732

[52] U.S. Cl... 214/16.4 A, 340/172.5, 340/174.1 C, 198/107, 198/210
[51] Int. Cl. .............................................. B65g 1/06
[58] Field of Search ................. 214/16.4 A, 16.4 R; 340/172.5, 174.1 C

[56] References Cited
UNITED STATES PATENTS

| | | | |
|---|---|---|---|
| 2,785,809 | 3/1957 | Riblet | 104/44 R |
| 2,918,656 | 12/1959 | Nolde et al. | 214/16.4 A X |
| 2,941,738 | 6/1960 | Burke et al. | 214/16.4 A X |
| 3,297,379 | 1/1967 | Artaud et al. | 214/16.4 A X |
| 3,495,695 | 2/1970 | Gettig et al. | 198/24 |
| 3,504,808 | 4/1970 | Carabateas | 214/16.4 A |

Primary Examiner—Robert J. Spar
Assistant Examiner—R. B. Johnson
Attorney, Agent, or Firm—Herbert F. Somermeyer

[57] ABSTRACT

Record medium containing articles are conveyed between a storage compartment wall, a read/write unit, and back to the storage compartment wall. A movable accessing mechanism selectively fetches articles (tape-containing cartridges) from the storage compartment wall and inserts same into a horizontally disposed pivotable input apparatus. The weight of the article in the input apparatus pivots it downwardly to a vertical position whereat the article leaves the input apparatus and enters a rotary conveyor. The rotary conveyor is automatically indexed between input, work, and output positions. The cartridge is indexed from the input to the work position of the rotary conveyor. Thereat, a reciprocating rotatable idler shaft moves a spool from the cartridge into a read/write unit for transducing operations. A single motor drives the conveyor and reciprocating shaft. On completion of the data processing operations, the spool is returned to the rotary conveyor, released from the idler shaft, and indexed to an output position. The cartridge then falls into an output apparatus and is returned to the compartment wall.

6 Claims, 12 Drawing Figures

ARTICLE CONVEYING

BACKGROUND OF THE INVENTION

The present invention relates to article handling and storing apparatus, particularly such apparatus useful for conveying articles such as record tape-containing cartridges, between an accessor and a read/write unit, then returning same to the accessor while maintaining orientation of the cartridge.

It has been desired over the last several years to provide large on-line data bases. To this end, the Burke et al. U.S. Pat. Nos. 2,941,738 and 2,941,739 show automatic tape libraries employing spooled magnetic tape. While the Burke et al. apparatus may provide extremely high data rates, yet greater data rates are desired. To this end, the length of tape on a given spool is reduced in length while increased in width. With such modification of the tape, tape-containing cartridges are also modified to accommodate the different shape. As a result of these geometric changes, the autoloader apparatus, i.e., the apparatus which transfers the tape-containing cartridge between an accessor or XY carriage and a tape drive or read/write unit as shown in Burke et al., is not suitable.

An attempt at achieving some of the above-stated results in a particular cartridge design is shown by Rinkleib in U.S. Pat. No. 3,631,971. To use the Rinkleib-described cartridge in the storage apparatus of the type envisioned, it is desired to have a magnetic disk for facilitating electromagnetic accessing always facing the travel path when stored in the storage compartment wall. When the cartridge is processed through the wall to an article-receiving station or read/write unit for document processing, this orientation must be maintained. Advantages of electromagnetic fetching include increased tolerances for successful, rapid storage and retrieval of such articles to and from storage compartments and/or input/output ports.

A further factor in the design of such apparatus is the competitive nature of the data processing industry. Accordingly, it is highly desirable that the autoloading apparatus be low-cost and operate with a minimum of power consumption. Accordingly, it is desired to use gravity as much as possible in transferring a tape-containing cartridge between an accessor and a read/write unit and back to an output port for access by the accessor. Additionally, a single motor should drive as much mechanical apparatus as possible in conveying tape-containing cartridges to and from the read/write unit. Another factor is the generation of debris; that is, in flexible media or tape systems, opening and closing cartridges usually includes rubbing surfaces together. Rubbing generated debris can cause contamination of the medium thereby increasing the probability of read and write errors in data processing operations. Accordingly, the apparatus should handle tape-containing cartridges in a manner which minimizes debris generation.

Another factor in high-speed operation is the precise coaxial alignment of a tape spool with its driving and idling apparatus. Such alignment should be done with simple apparatus and in such a manner that manufacturing tolerances are maximized.

SUMMARY OF THE INVENTION

It is an object of the present invention to provide an article orientation-maintaining apparatus while transferring the article from a compartment wall through a rotary conveying apparatus, a read/write unit, and an output apparatus. It is preferred that the article be a tape-containing cartridge.

In accordance with the invention, an input apparatus includes a pivotable sleeve normally in a horizontal position for receiving a document-containing article or cartridge. The weight of the tape-containing cartridge or article pivots the input sleeve downwardly with an arcuate guide retaining the article within the sleeve until both reach a vertical position. The article, by gravity, then descends into a rotary conveyor. Insertion into the rotary conveyor is suitably sensed, then the rotary conveyor is automatically indexed by a driving mechanism for moving the cartridge from the input position to a work position. At the work position, a reciprocating idler shaft engages a spool within the tape-containing article and moves it downwardly through the rotary conveyor into a read/write unit immediately below the rotary conveyor. The tape is unspooled and subjected to suitable transducing operations. Upon completion of such operations, the tape is rewound on the spool; and the idler shaft is reciprocated upwardly, returning the spool into the rotary conveyor. The rotary conveyor is then indexed, moving the cartridge to an output position. While the cartridge is in the work position, a second cartridge may be introduced into the rotary conveyor.

At the output position, the cartridge falls through an aperture into a gravity-actuated output apparatus for transferring the cartridge to an output port while maintaining orientation such that one axial end is always facing an opening in the storage compartment wall with which the apparatus is employed.

A preferred rotary conveyor usable with the present apparatus contains a small number of articles respectively in such small number of article retainers. The retainers loosely receive an article to be conveyed. In a preferred form, the conveyor is indexed in three steps per revolution yielding an input position, a work position, and an output position. A stationary upstanding circular cylindrical center post coaxially disposed with respect to the rotary conveyor provides one precise locating point of a triangulated cartridge location. A pair of parallel axially spaced-apart spring-loaded retainers or guide arms yieldably urges the cartridge to the center post with each guide arm having two cartridge-engaging points for engaging each cartridge in the retainer at the work position against the center post such that the two cartridge-engaging points are two and the center post is the third triangulated point for precisely locating the cartridge with respect to the work position.

The foregoing and other objects, features, and advantages of the invention will be apparent from the following more particular description of a preferred embodiment of the invention, as illustrated in the accompanying drawing.

THE DRAWING

FIG. 5A shows a reference position, while FIG. 5B shows a work position.

GENERAL DESCRIPTION

Referring now more particularly to the drawings, like numerals indicate like parts of structural features in the various views and diagrams. Each of a plurality of tape-containing articles or cartridges 42 in storage compartment wall 10 has an outwardly facing magnetic disk 45 to facilitate electromagnetic accessing from the storage wall compartments or input/output ports. Each article 42 is storable along a horizontal axis in a compartment 11 within wall 10. Since only one electromagnetic disk 45 is provided on each article, it is important that the orientation of each article 42 be maintained with the disk always facing outwardly from the storage compartment wall. An accessor 28, described in detail later with respect to FIGS. 2 and 3, selectively accesses an article 42 from wall 10 and moves same to a read/write input apparatus including input sleeve 12. Accessor 28 inserts an article 42 into input sleeve 12 of the input apparatus. Upon withdrawal of accessor 28, the weight of the article pivots sleeve 12 downwardly in the direction of the arrow about pivot axis 13. During such pivoting, arcuate guide 14, stationarily mounted within wall 10, retains article 42 within sleeve 12. Sleeve 12 being in a vertical (dotted line form 51 of FIG. 4) or discharging position is immediately above an input position of rotary conveyor 15. In such article discharging position, article 42 descends into rotary conveyor 15. A suitable sensing switch 66 signifies to control apparatus 65 that an article 42 has been received by conveyor 15. At this time, motor 17 is actuated for driving scotch yoke driver and synchronizer 16 to rotate conveyor 15 in a clockwise direction, as viewed from the top, for moving a received cartridge 42 from the input position to a work position. In the work position, article 42 is precisely coaxially aligned with reciprocating idler shaft 18, a part of scotch yoke driver 16. Continued rotation of motor 17 allows conveyor 15 to remain stationary while motor 17 reciprocates idler shaft 18 downwardly to engage tape spool 43 of the tape container 42 and separate it from cylindrical cover 44. Spool 43 moves downwardly onto drive spindle 20 of read/write unit 19 whereat tape is unspooled for transducing operations, as will become apparent.

Figure 1:
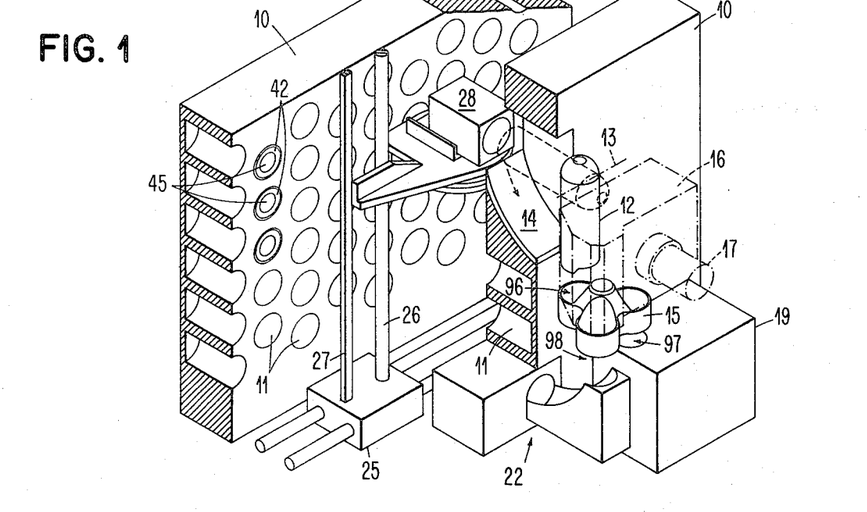
FIG. 1 is a simplified diagrammatic view of apparatus employing the present invention showing input-to-output travel paths of the cartridge.

Upon completion of the transducing operations, the tape is rewound onto the spool, then idler shaft 18 returns the spool to rotary conveyor 15 reinserting same into the cover 44. On completion of this operation, motor 17 drives scotch yoke 77 to rotate conveyor 15 to move a cartridge to an output position whereat it descends into output apparatus 22.

While the cartridge 42 is in a work position, a second cartridge may be inserted into input apparatus 12 and thence conveyed to the rotary conveyor 15 in its input position 96.

DESCRIPTION OF ACCESSOR

Figure 2:
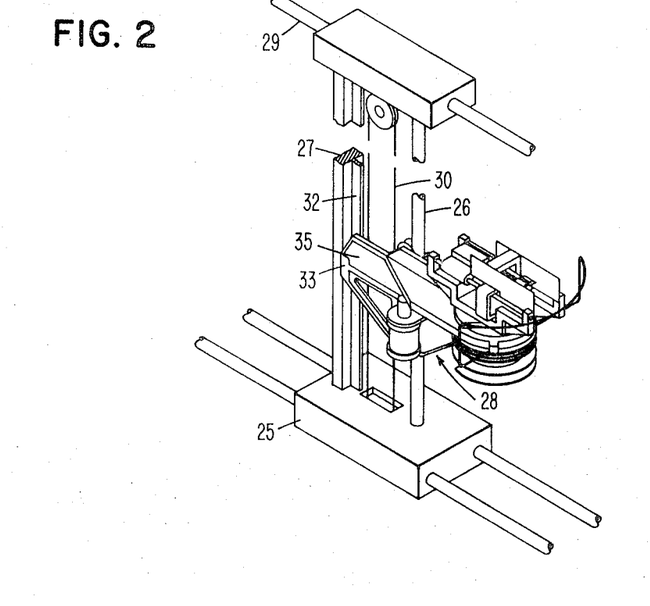
FIG. 2 is a simplified diagrammatic perspective view of an accessor usable in an article storage and retrieval apparatus.
Figure 3:
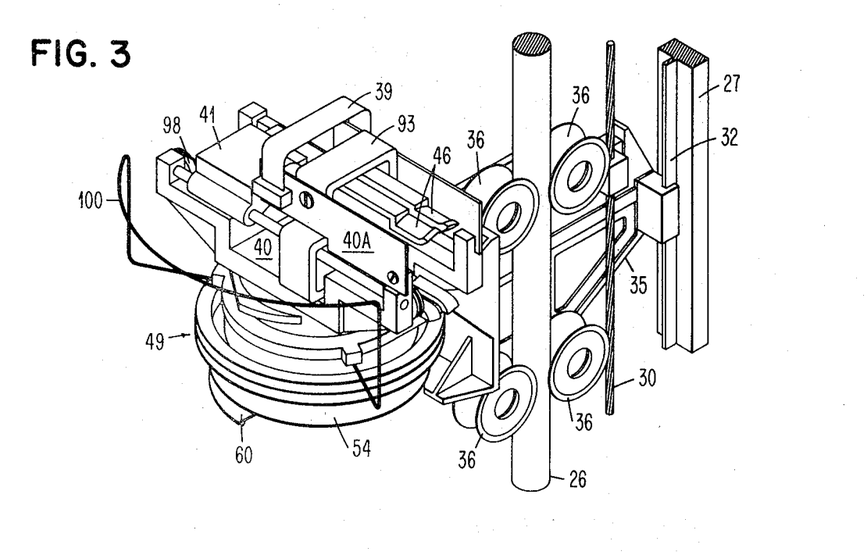
FIG. 3 is a view of a pivoting article handler usable with the FIG. 2 illustrated apparatus.

An accessor usable with the present invention is shown in FIGS. 2 and 3. Main or horizontally movable carriage 25 has an upstanding elevator post 26 spaced from upstanding guide post 27. The two posts are spaced apart for precisely guiding elevator 28 along a vertical path. Stationary upper horizontal rail 29 is engaged by the upper end portion of posts 26 and 27 for ensuring precise vertical alignment. Elevator 28 is powered vertically by a motor within main carriage 25 through a cable system including cable 30. Precise location of elevator 28 is indicated by the positioning system described in Beach et al. U.S. Pat. No. 3,584,284. Upstanding elevator post 26 is preferably circular for maintaining the precise alignment of elevator 28 between the facing walls as the guide post wears from extended usage.

Guide post 27 has forwardly extending tooth 32 riding in a mating groove at the rearward end portion 33 of elevator 28.

Each elevator 28 includes cast frame 35 rotatably supporting four spaced-apart circumferentially grooved rollers 36. The adjustment of these rollers provides precise horizontal alignment of platform 37 integrally formed on frame 35. Rotation of elevator 28 about post 26 is prevented by the above-described guide post engagement with rear portion 33. In addition to drive cable 30 moving elevator 28 along a vertical travel path, a flexible signal and power cable extends from main carriage 25 to elevator 28. This flexible cable is connected to a junction board (not shown) which in turn supplies power through flexible cable 39 to circuit board 40A.

An annular ball bearing assembly (not shown) precisely supports bed 40 on horizontal platform 37 for pivoting about a vertical axis between stable positions 1 and 3 respectively facing one of two spaced-apart parallel storage walls 10 (only one shown). Reciprocating or article carriage 41 is movably disposed on bed 40 for reciprocating motion between a travel position central of the pivoting bed and a load/unload position wherein the carriage is disposed over the front end portion of pivoting bed 40.

The operation of the device is as follows. Elevator 28 is appropriately vertically positioned, while the main carriage assumes its selected horizontal position. To fetch a document-containing article, pivotable bed 40 is pivoted to a stable position. As shown in FIG. 3, upon reaching stable position 1, a carriage motor (not shown) via a carriage driving capstan (not shown) moves carriage 41 forwardly. At the start of the forward stroke, electromagnet 45 is energized attaching the article to be loaded to the electromagnet. Reciprocating carriage 41 then returns to the travel position with the article being carried by an electromagnet (not shown) between flexible and resilient article retaining fingers 46. Electromagnet 45 may remain energized during main carriage travel.

The main carriage and elevator are then moved to the storage compartment or transfer port to which the article is to be lodged. Assume that it is on an opposite wall. The pivoting bed is then rotated 180° to stable position 2. When the main carriage 25 and elevator 28 are at the appropriate storage location and pivotable bed 40 is in stable position 2, reciprocating carriage 41 is again moved forwardly to the load/unload position. At the start of the forward stroke of reciprocating carriage 41, the electromagnet is de-energized. Upon reaching the unload position, the article is in the storage compartment or transfer port. Reciprocating carriage 41 is then returned to the travel position as shown in FIG. 3, and subsequent operations are performed.

To accommodate pivotable bed 40 being driven by pivotable bed drive motor 47 mounted on the lower side of frame 35, platform 37 has a central opening (not shown) through which depending shaft 48 of bed 40 extends. Driven cable drum 49 is securely fastened to depending shaft 48. A driving cable (not shown) extends about cable drum 49 and is fixedly secured to pivotable bed driving capstan 51 at the upper end of drive motor 47. Control circuits (not shown) control motor 47 to selectively move between stable positions 1 and 2. Drive motor 47 is preferably of the low-voltage DC type.

The power and signal cable extending between the junction board and circuit boards 40A on pivotable bed 40 includes a multiturn wrap about an electrical cable drum (not shown). On an inner radius of the cable drum, cable 39 is folded at 90° and extends upwardly for electrical connections to circuit boards 40A. The cable drum includes lower radially outwardly extending flange 54 for retaining cable 39 in the illustrated position. In stable position 1, cable 39 is relatively snuggly wrapped about the cable drum. As pivotable bed 40 pivots to stable position 2, cable 39 tends to unwrap. To facilitate equal unwrap in all turns of cable 39, a mildly resilient spring is secured to the inner turn of cable 39. This spring, preferably of molded plastic, urges the inner turn of cable 39 to expand radially outwardly. As tension is relieved on cable 39 and as pivotable bed 40 pivots toward stable position 2, a spring (not shown) urges the inner turns outwardly, taking up the slack that would normally occur in the outermost turn thereby keeping the outermost turn of cable 39 within the confines of radially outwardly extending flange 54.

DESCRIPTION OF INPUT APPARATUS

Figure 4:
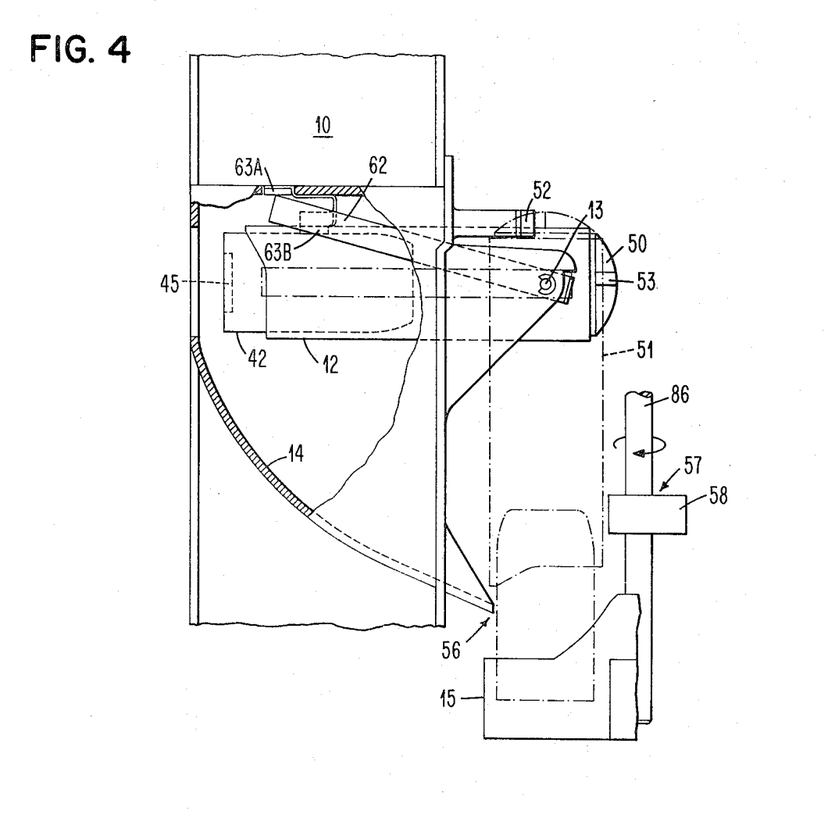
FIG. 4 is a simplified diagrammatic showing of a gravity-actuated input apparatus usable with the present invention.

As best seen in FIG. 4, the input apparatus including pivotable sleeve 12 is disposed directly over an input position of rotary conveyor 15. Insertion of a tape-containing cartridge 42 into input sleeve 12 overcomes the upward urging of counterweight 50 to pivot sleeve 12 downwardly to vertical article discharging position 51. While sleeve 12 pivots downwardly, arcuate stationary guide 14 keeps cartridge 42 from sliding out of sleeve 12. A pair of magnets 52 suitably cushion mounted on wall 10 magnetically engages detent or keeper 53 of sleeve 12 to releasably retain sleeve 12 at position 51. Article 42 descends immediately after leaving ramp 14 as at 56 into rotary conveyor 15. Sleeve 12 is maintained in the vertical position until after rotary conveyor 15 has been indexed as described with respect to FIGS. 5A and 5B. Included in the indexing operation is rotation of the input carrier return kicker 57 which has three radially outwardly extending teeth 58, one for each index position of rotary conveyor 15, which engage sleeve 12 when in the vertical position impacting it to return to horizontal input position as illustrated in FIG. 4. The timing of input carrier return 12 with respect to rotation of conveyor 15 is discussed later in detail.

Input apparatus includes pivoted and elongated arm 62 which engages adjustable stop or bumper assembly 63A when sleeve 12 is in the horizontal or receiving position. When sleeve 12 is in position 51, arm 62 pivots downwardly to block the input apparatus. This action prevents accessor 28 from inserting a cartridge 42 into input apparatus until sleeve 12 has returned to its horizontal or input position. Cushioned stop 63B keeps sleeve 12 at its input position. Weight 50 on sleeve 12 may be replaced by a spring assembly (not shown). A suitable damped spring assembly may reduce bounce and thereby increase throughput speeds of the input apparatus.

SCOTCH YOKE OPERATION AND CONVEYOR ROTATION

Figure 5A:
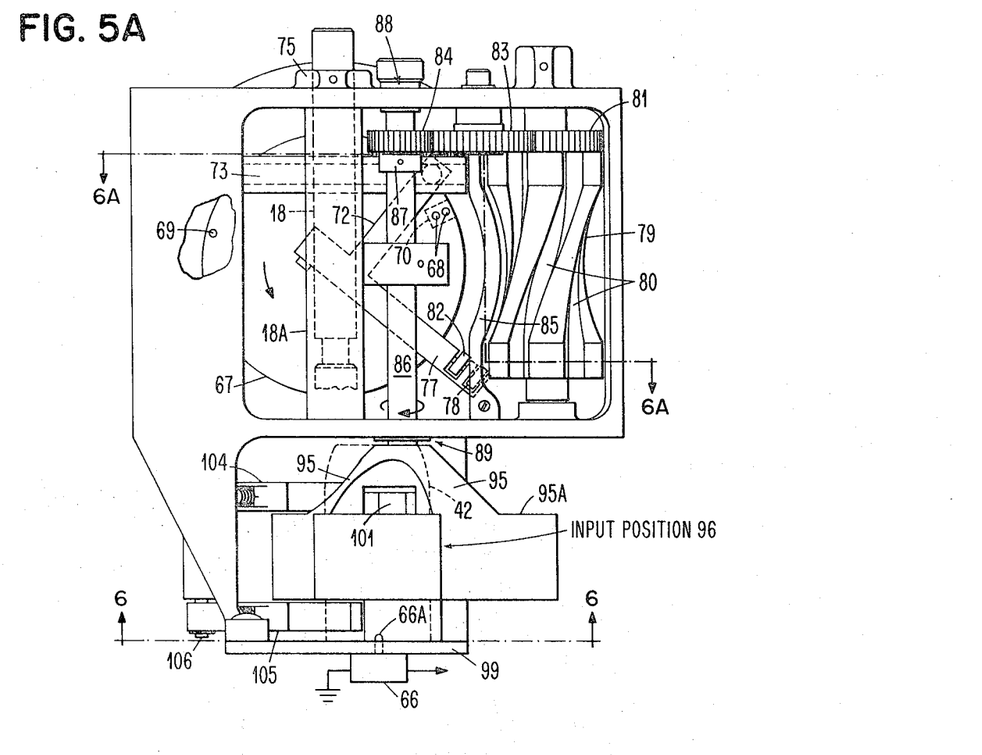
FIGS. 5A and 5B are simplified diagrammatic showings of a scotch yoke driver usable for indexing a rotary conveyor and simultaneously actuating a reciprocating idler arm for moving a tape cartridge between work, loading, and unloading positions.

Referring next to FIGS. 5A, 5B, 6 and 6A, the rotary conveyor 15 and driver 16 is described. FIG. 5A illustrates the apparatus in the so-called "home" position. In this position, rotary conveyor 15 is prepared to receive a cartridge from the input apparatus; and the cartridge in the work position of the rotary conveyor is ready to be exited. A cartridge may or may not reside in output apparatus 22 as will become more apparent. The scotch yoke apparatus is ready to index the rotary conveyor and insert a received cartridge into the read/write unit 19 upon closure of switch 66 mounted in bottom plate 99 in the input position of the rotary conveyor corresponding with input basket 96. When sleeve 12 is in the vertical position and a cartridge drops into basket 96 of conveyor 15, upstanding switch actuator 66A is depressed closing switch 66 and actuating motor control 65, hence, motor 17, to operate. Motor 17 rotates control disk 67 and the attached apparatus, as will become apparent, in a counterclockwise direction as viewed in FIGS. 5A and 5B. Disk 67 rotates until position indicating aperture 69 is in sensing proximity to photoelectric sensor 70 which deactivates motor control 65 and motor 17 to stop the apparatus in the so-called work position illustrated in FIG. 5B. Control disk apertures 68 being in sensing proximity to sensors 70 indicate the home position.

Figure 5B:
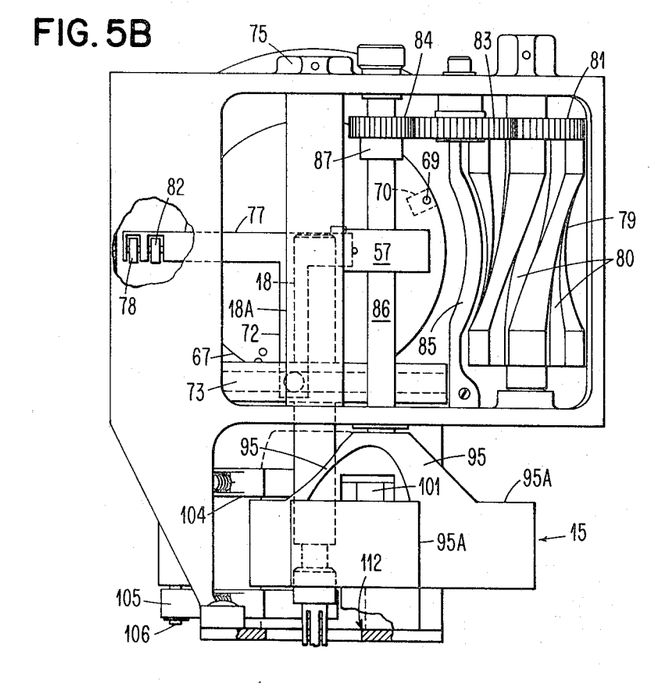

When the illustrated apparatus is in the work position of FIG. 5B, the spool in the tape cartridge has been moved to the work position and idler shaft 18 has descended in sleeve 18A moving the spool in the cartridge from rotary conveyor 15 into read/write unit 19 for transducing operations. Upon completion of the transducing operations, motor control 65 and motor 17 are actuated by a "complete" signal from read/write unit 19. This actuation causes motor 17 to rotate counterclockwise about 60° from the FIG. 5B illustrated position. At this extent of rotation, the cartridge spool should have been returned to the cartridge and snapped in place. At this time, whether or not the cartridge is in place within rotary conveyor is sensed by a photocell (not shown). If not in place, the motor is backed up to the FIG. 5B illustrated position as the cartridge unloading from the read/write is retried. Assuming successful unloading from read/write 19, motor 17 continues rotating counterclockwise until the FIG. 5A illustrated position is reached which completes a load and unload cycle for the illustrated apparatus.

The above-described apparatus provides a "straight-through" work flow by a unidirectional motor, no mechanical reversals or article interferences. During each motor revolution, a cartridge is transferred from a work station to an output station, plus a second cartridge from an input station to such work station.

Figure 6:
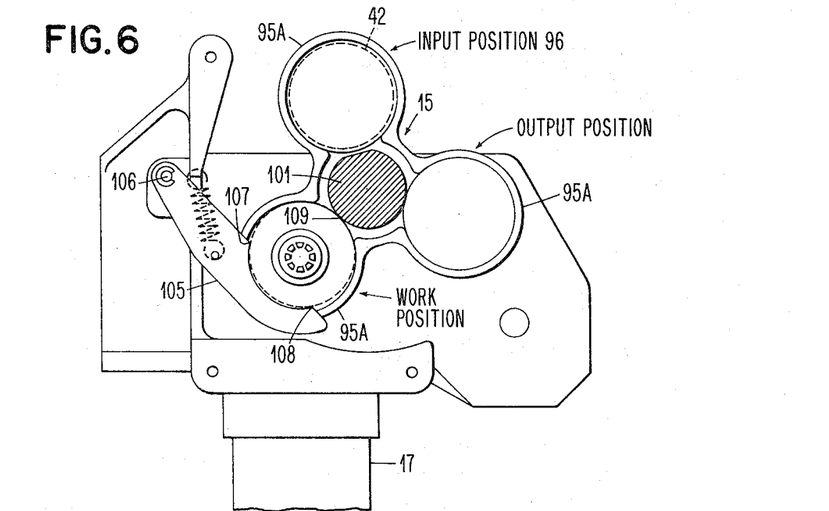
FIG. 6 is a simplified inverted sectional view of the FIG. 5A illustrated apparatus taken in the direction of the arrows along line 6—6 in FIG. 5A.
Figure 6A:
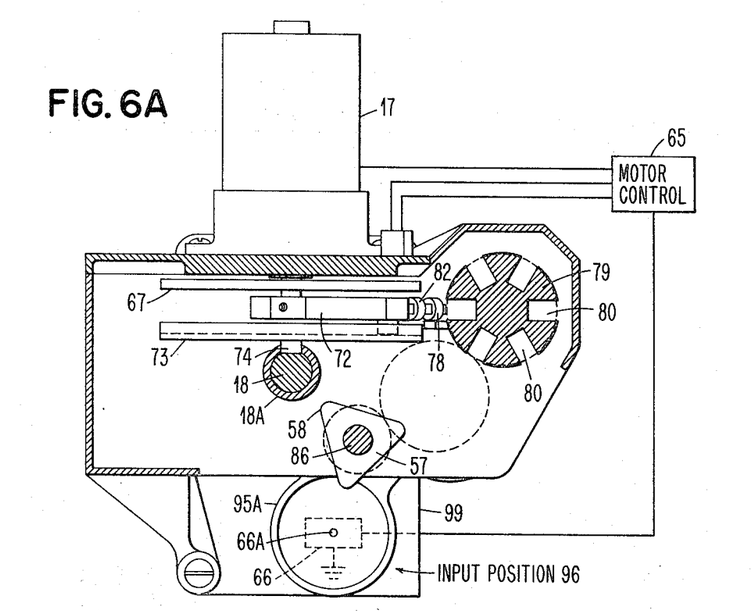
FIG. 6A is a simplified sectional plan view of the FIG. 5A illustrated apparatus taken in the direction of the arrows along line 6A—6A.

Rotary conveyor 15 indexing is synchronized and driven by the scotch yoke apparatus 16. On the motor shaft, which is fixed to control disk 67, is a scotch yoke arm 72 having a roller mounted within scotch yoke channel 73. As is well known for scotch yoke assemblies, as scotch yoke arm 72 rotates with the motor 17 shaft, scotch yoke channel 73 moves up and down in a reciprocating manner in accordance with motor 17 rotation. Scotch yoke channel 73 is securely affixed to idler arm 18 as at 74 (FIG. 6A). Motor 17 rotation thereby reciprocates with rotary conveyor 15 rotation between the FIGS. 5A and 5B illustrated positions. Idler shaft 18 is slidably supported in bearing 75 at the upper portion of the frame.

To convert the rotary motion of motor 17 and control disk 67 to rotation of rotary conveyor 15 in precise synchronism with shaft 18 reciprocation, rotary cam 79 couples the rotational motion during a part of the cycle of disk 67 to rotary conveyor 15. For each complete cycle of counterclockwise rotation of disk 67, rotary conveyor 15 is indexed 120°. Also, rotation of conveyor 15 is limited to but a small portion of disk 67 rotation with the remaining portion of the cycle driving shaft 18. In moving from home position toward work position of disk 67, conveyor 15 first rotates 120°, input apparatus sleeve 12 is returned to its horizontal position by kicker 57 tooth 58, and then shaft 18 removes the cartridge tape spool 43 from conveyor 15 and inserts it into read/write unit 19. Upon completing the cycle, continued rotation of disk 67 from the FIG. 5B illustrated position operates shaft 18 first, returning the cartridge tape spool to the conveyor and the apparatus to the home position in preparation for the next cycle.

Control disk 67 also includes radial cam driver arm 77 having cam actuating roller 78 at the radial extremity thereof. As arm 77 rotates counterclockwise, roller 78 enters one of the six grooves 80 of rotary cam 79 rotating it by one-sixth of a revolution. Each 1/6 revolution of cam 79 is translated into a 1/3 revolution of rotary conveyor 15 by driving gear 81, idler gear 83, and driven gear 84. Driven gear 84 is adjustably secured to a driven shaft 86 which, in turn, is fixedly secured to rotary conveyor 15. Adjustment collar 87 allows adjustment of position of rotary conveyor 15 with respect to rotary cam 81 and, hence, the scotch yoke synchronizing apparatus. In this manner, precise coordination between rotary conveyor 15 and reciprocating idler shaft 18 is achieved. Shaft 86 is precisely journaled at 88 and 89 to the frame. Rotary cam 79 may rotate at any selected ratio to conveyor 15 rotation; i.e., rather than a 2:1 ratio, it can be 1:1, etc.

As roller 78 actuates rotary cam 79, its axial position with respect to disk 67 is restrained by a pair of spaced-apart guides 85 (FIG. 5A). Arm 77 further includes a second guide roller 82 which rolls between guides 85 for restraining axial deformation of arm 77 to thereby precisely rotate cam 79 one-sixth of a revolution for each engagement of roller 78 in groove 80.

Conveyor 15 includes a set of webs 95 depending from driven shaft 86. Webs 95 are integrally formed with the three retainers 95A which loosely receive a cartridge 42. The rotation of conveyor 15 successively moves each retainer 95A to the work position of FIG. 5B, thence to the output position and back to the input position. Immediately below the input position is bottom plate 99 which restrains the cartridge from falling completely through the rotary conveyor 15. As conveyor 15 rotates, each of the cartridges slides along bottom plate 99.

Since a cartridge is loosely held within a retainer 95A, wide tolerances are permitted in the manufacture of the inventive apparatus. However, precise coaxial alignment of the tape spool in the cartridge with reciprocating idler roller 18 is required in the work position. To this end, a precisely located and manufactured center post 101 cooperates with guide arms 104 and 105 to precisely guide cartridges in the above-mentioned coaxial alignment. Guide arms 104 and 105 are pivoted about a common pivot pin 106 and are spring urged to a radial inward position, as best seen in FIG. 6. The axial alignment of a cartridge in the work position results from three contact points 107, 108, and 109 between arms 104 and 105 and center post 101. This triangulated contact coaxially aligns the cartridge with reciprocating shaft 18. Note that center post 101 axially extends beyond the basket extent of conveyor 15, while arms 104 and 105 are, respectively, on the upper and lower sides of retainers 95A thereby providing six points or two triangulations for locating the cartridge with respect to the reciprocating shaft 18. The received cartridge is now ready to be inserted into read/write station 19.

Figure 8:
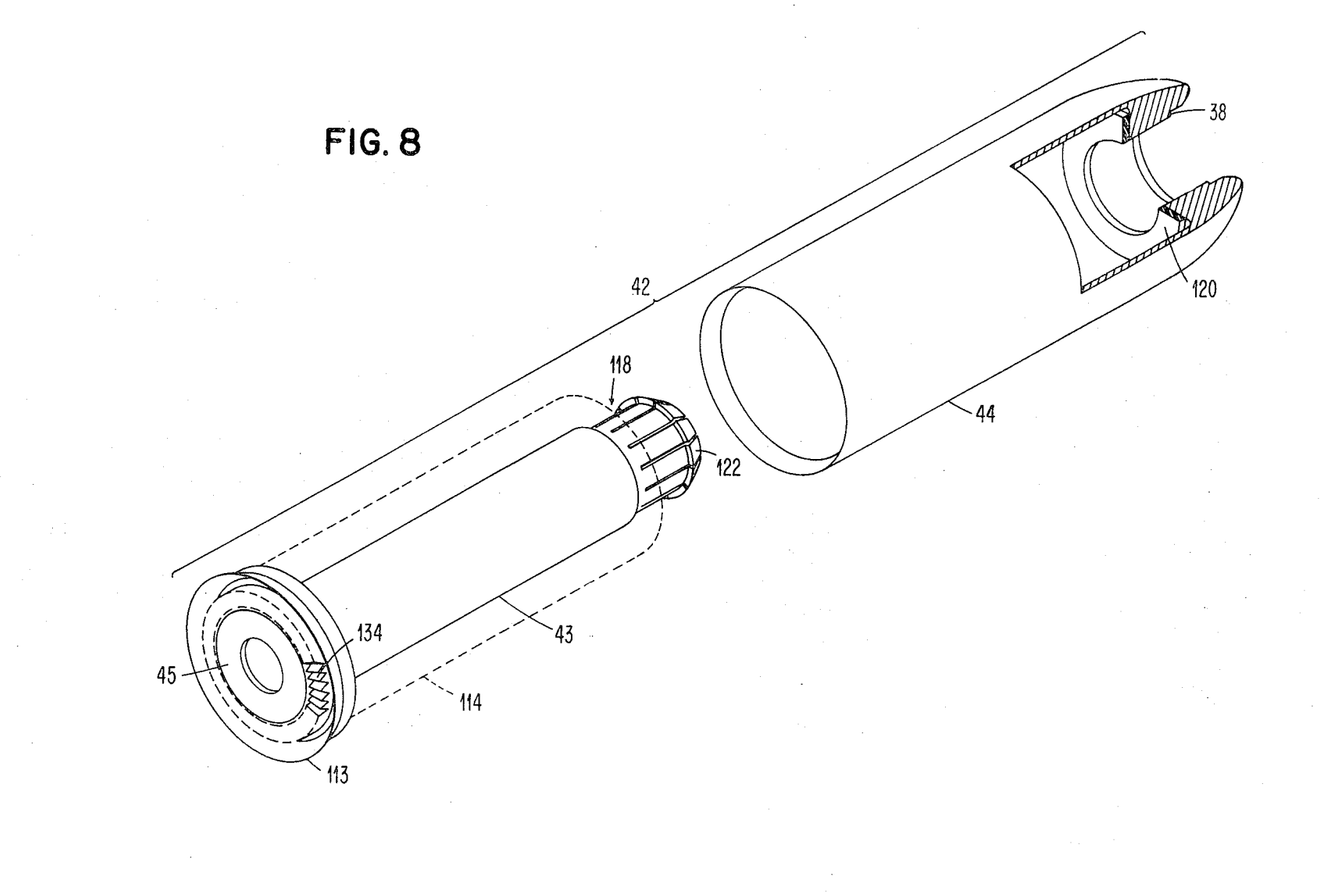
FIG. 8 is a diagrammatic showing of a tape-containing cartridge to be conveyed by the illustrated apparatus.

The cartridge insertion into the read/write, operation of read/write 19, and extraction of the cartridge from read/write back into conveyor 15 is described in detail. Referring first to FIG. 8, tape-containing cartridge 42 consists of two parts. The first is a single-flanged hollow core tape spool 43 adapted to receive the second member, hollow cylindrical cover 44. Single flange 113 on hollow core spool 43 interference fits with the large open end of cover 44, while axially extending fingers 118 on spool 43 releasably engage lip 38 on cover 44 for securing the two parts together. A length of tape 114 is suitably wound on spool 43. Apertured metal plate 45 on flange 113 facilitates the above-referred-to electromagnetic picking. A rubber washer 120 seals the lip 38 end of cover 44 when engaged with the spool for forming a dust-tight tape container. Cartridge 43 is inserted into rotary conveyor 15 with flange 113 facing downward or toward the viewer in FIG. 6. Work position of conveyor 15 includes radially inwardly extending lip 112 for retaining cover 44 in the conveyor when spool 43 comes unlatched from cover 44 and is moved downwardly into read/write 19 by reciprocating idler shaft 18.

LOADING AND UNLOADING READ/WRITE UNIT 19

Figure 7:
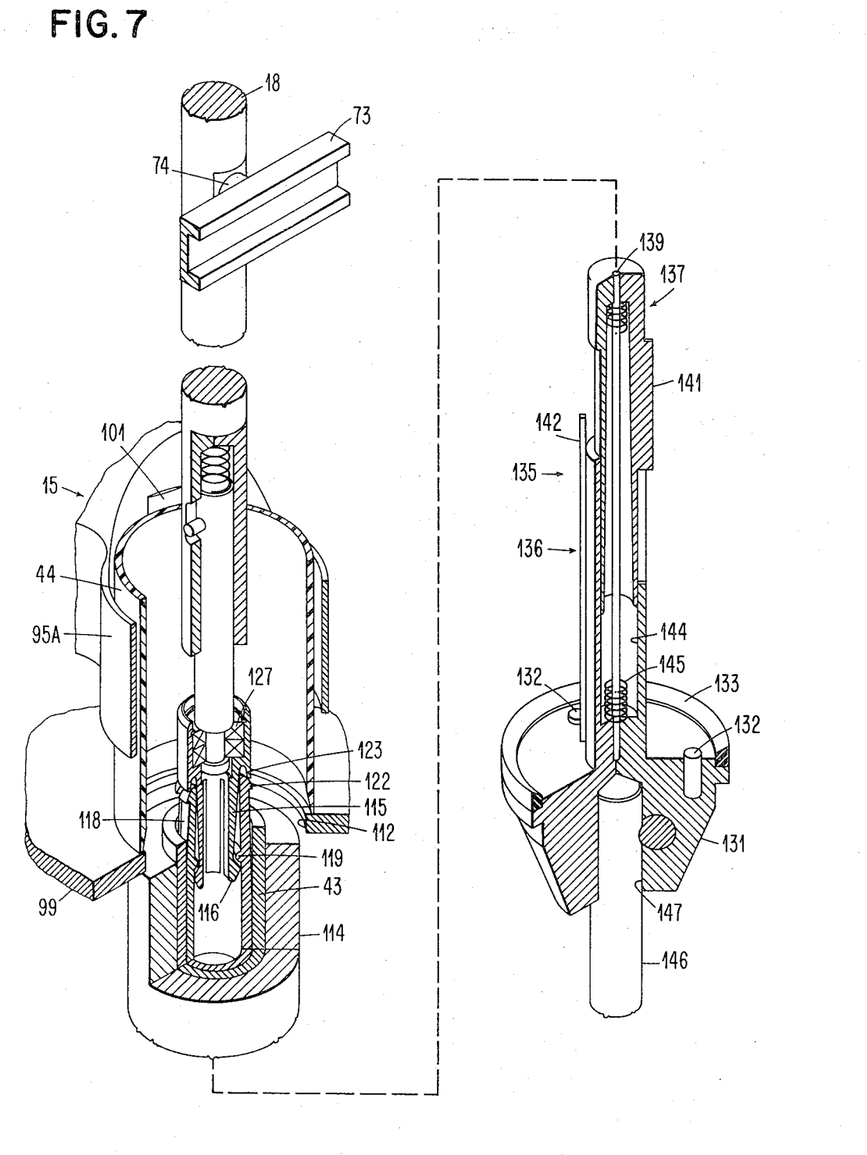
FIG. 7 is a simplified diagrammatic showing of reciprocating apparatus usable for transferring cartridges between a rotary conveyor and a read/write station.

Referring next to FIG. 7, as channel 73 lowers idler shaft 18 through rotary conveyor 15, depending resilient steel fingers 115 move inside the axially extending fingers 118 of spool 43. Radially outwardly extending latching portions 116 on fingers 115 ride over circumferential radially inwardly extending rib 119 of fingers 118 to lock idler 18 to the tape spool. Simultaneously, annular cam 123 on the lower end of idler shaft 18 engages the outer surfaces 122 of axial fingers 118 moving them inwardly away from cover latching edge 38 thereby freeing spool 43 from cover 44. Continued downward movement of shaft 18 secures the spool to the shaft by the combined action of the radial outward urging of fingers 115 at rib 119 and the radial inward urging of annular cam 123 on the outer surfaces 122 of fingers 118. A set of idler bearings 127 permits independent rotation of spool 43 by the later-described spool driving shaft. Cover 44 remains in conveyor 15 on annular lip 112 of plate 99.

In read/write unit 19, there is an upstanding drive shaft 135 mounted on chuck 131. Chuck 131 is suitably mounted on a drive shaft 146 within recess 147. Flange 113 is accurately positioned on chuck 131 by a set of three precisely located pins 132 (only two shown) engaging the metal disk 45 on flange 113. This triangular support ensures that the axis of rotation of spool 43 is precisely coaxial with the axis of rotation of chuck 131 and shaft 135. Additional driving engagement is provided by the serrations 134 on flange 113 (FIG. 8) securely engaging rubber ring 133 fixedly secured to chuck 131.

Upstanding drive shaft 135 has two parts. The first is the splined shaft 136 fixedly secured or integrally formed with chuck 131. Additionally, splined end portion 137 is telescopically mounted in hollow upstanding shaft 136. Spring 145 coaxially mounted within shaft 136 and end portion 137 urges axially upward to receive spool 43 and guide same onto drive shaft 135. A plurality of splines (not shown) within tape spool 43 slidably engage splines 141 and 142 for providing driving engagement with driving chuck 131. Rubber ring 133 prevents slight hunting actions as the direction of rotation is rapidly reversed. Center guide rod 139 provides axial alignment of portion 137 with shaft portion 136. It is preferred that end portion 137 have a snug aligning fit within cavity 144 of upstanding splined shaft 136.

After the tape spool 43 is mounted over upstanding shaft 135, the shaft is selectively rotated for transducing operations, as will be later described with respect to FIG. 9. For the moment, assume that the transducing operations have been completed and tape spool 43 is to be returned to cover 44 in conveyor 15. Motor 17 is actuated by the "complete" signal, as above mentioned to move reciprocating shaft 18 upwardly. This action carries the tape spool 43 from upstanding drive shaft 135 back into cover 44. As fingers 118 and the tape 114 engage washer 120 and lip 38 (FIG. 8), cover 44 moves against and is stopped by the frame at 125 (FIGS. 5A and 5B). The frame has a small aperture at 125 through which shaft 18 descends to engage spool 43. Radially enlarged ends 116 (FIG. 7) on fingers 115 ride over rib 119 disengaging shaft 18 from the spool and clearing fingers 118 from annular cam 123. Fingers 118 immediately snap outwardly engaging edge 38 and securing spool 43 to cover 44. This action prepares cartridge 42 for being conveyed from the work position to the output position.

In the event ends 122 on fingers 118 did not latch on lip 38, spool 43 falls downwardly back over shaft 135. The arrangement is such that a light path is broken beneath conveyor 15, which is sensed by mechanisms (not shown) for indicating a faulty read/write exit. At this time, motor 17 can be reversed for re-engaging idler 18 to spool 43 and again lifting it into conveyor 15 for locking engagement with cover 44.

After the cartridge 42 is removed from read/write 19, conveyor 15 is again rotated as above described with the cartridge falling downwardly through an aperture (not shown) in bottom plate 99 into output apparatus 22, as will be described later with respect to FIG. 10.

READ/WRITE UNIT 19

Figure 9:
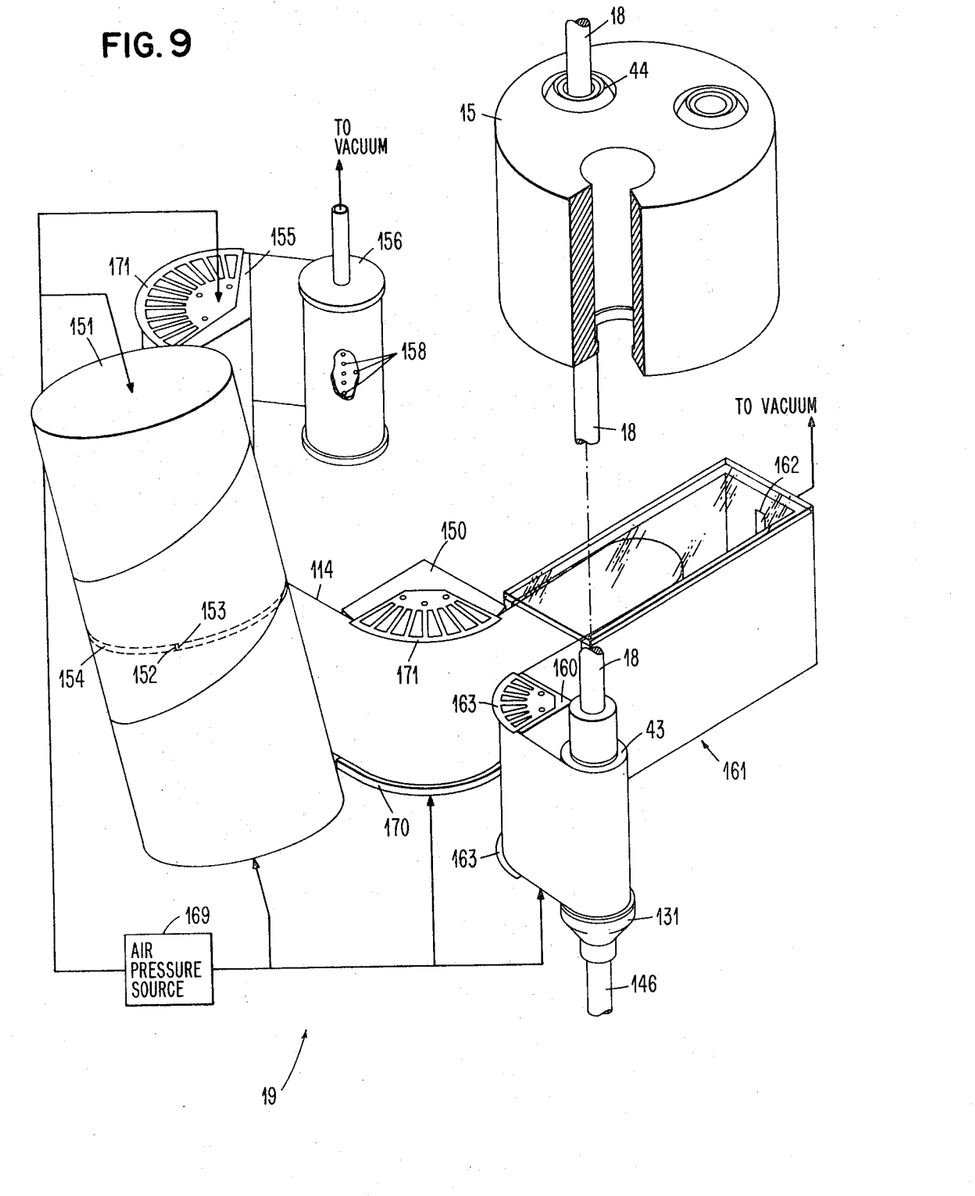
FIG. 9 is a diagrammatic showing of a read/write station usable with the present invention and illustrating its geometric relationship to the rotary conveyor.

The relationship of rotary conveyor 15, reciprocating shaft 18, chuck 131, and tape spool 43 to the read/write unit 19 is diagrammatically illustrated in FIG. 9. Tape spool 43 is shown securely mounted on chuck 131 with tape 114 partially unspooled into the read/write apparatus. In this apparatus, entry guide 150 guides tape 114 onto mandrel 151. The tape portion wrapping mandrel 151 is scanned by two magnetic heads 152 and 153 on rotor 154, the write and read heads, respectively. After the tape leaves the mandrel, exit guide 155 guides the tape to takeup reel 156. The hub of the reel 156 contains ports 158 through which a vacuum may be pulled to attract and hold tape 114 on reel 156.

Entry guide 150 accurately guides tape 114 from the tape spool 43 to mandrel 151. Spool guide 160 guides tape 114 from spool 43 to vacuum column 161. Vacuum is pulled in column 161 through vacuum port 162. Spool guide 160 accommodates axial variations in spool 43 positioning. Spaced-apart compliant guides 163 engage both edges of tape 114 to compensate for axial positioning errors.

Vacuum column 161 is a constant force buffer controlling tape tension with take-up reel 156. A secondary function of vacuum column 161 includes lateral guiding tape 114 into entry guide 150.

Each guide 150, 155, and 160, plus mandrel 151, has an air bearing for tape 114 motion. Air source 169 supplies air through holes in the mandrel and guides. Tape guiding in both entry guide 150 and the exit guide 155 is by fixed guide 170 for one edge of the tape and a compliant guide 171 at the other edge of the tape.

In threading, spool 43 is rotated supplying tape 114 to vacuum column 161 entry guide 150, thence onto mandrel 151. The tape wraps the mandrel 151 helically along the path of the rotating heads on rotor 154. The length of tape wrapping the mandrel is the portion of the tape whose tape path stability is maintained to achieve data signal transducing operations. From the mandrel 151, the tape proceeds through exit guide 155 to take-up reel 156. Respooling the tape follows the reverse procedure.

OUTPUT APPARATUS

Figure 10:
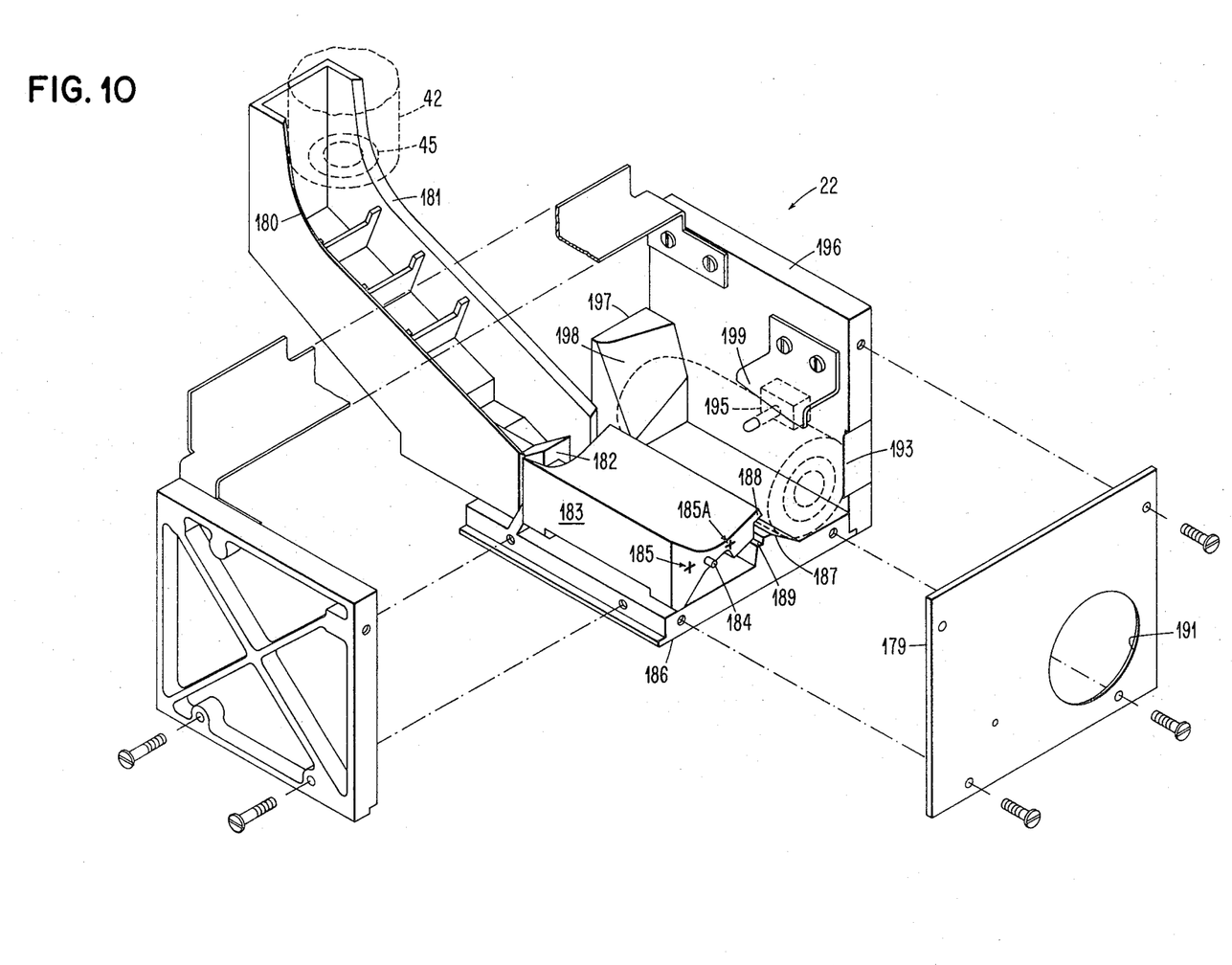
FIG. 10 is a simplified diagrammatic perspective showing of gravity-actuated output apparatus usable with the present invention.

Referring next to FIG. 10, the output apparatus 22 is illustrated and described. From the output position of rotary conveyor 15, cartridge 42 drops downwardly and engages arcuate ramps 180 and 181 which are spaced apart to receive and guide the cartridge from a vertical descending position to a horizontal exit position. Magnetic end 45 of cartridge 42 must face the front wall 179 of the exit apparatus. Descending cartridge 42 rides over spring-loaded stop 182 and thence onto pivoted cradle 181. Cradle 183 is mounted for pivoting about pivot pin 184 journaled in front wall 179 and an upstanding standard (not shown) intermediate guides 180 and 181 and cradle 183. The upper surface of cradle 183 may be designed to receive the cylindrical cartridge 42. When in the illustrated position, cradle 183 bears against lower wall 186 under the gravitational urging of the center of gravity of the cradle as at 185. Cartridge 42 being inserted onto cradle 183 shifts the center of gravity to the opposite side of pivot pin 184 as at 185A. Cradle 183 then pivots until forward edge 188 engages upward opening groove 189 of descending ramp 187. At this position, cartridge 42 rolls onto ramp 187 and then into the exit position wherein metal plate 45 is facing forwardly through aperture 191 of front wall 179. A flexible plastic liner 193 rims the edge of aperture 191 to prevent cartridge 42 from bouncing forwardly through the aperture, yet permits a particular mechanism to extract the cartridge 42 from the exit apparatus.

Rear wall 197 may have a lower guide 198 guiding and positioning the cartridge 42 into an exit position. Additionally, upper guide 199 may prevent it from bouncing upwardly and getting caught crosswise in the exit station. Two cartridges 42 may be positioned in the exit apparatus at one time, one in the exit position immediately aligned with aperture 191 and one residing on exit ramp 187.

To signify that a cartridge is to be exited to suitable conveying apparatus, switch 195 is suitably mounted into side wall 196. When closed, a signal is supplied signifying that a cartridge is in the exit apparatus.

While the invention has been particularly shown and described with reference to a preferred embodiment thereof, it will be understood by those skilled in the art that various changes in form and detail may be made therein without departing from the spirit and scope of the invention.

What is claimed is:

1. Article conveying apparatus for handling axially elongated circularly cylindrical articles, the improvement including in combination:
   a storage compartment wall having an open side for storing a plurality of the articles with a given end always facing outward from said open side when stored, during storage said articles having an axis disposed horizontally;
   an article receiver having an open end and pivotable between horizontal and vertical positions, when in a horizontal position said open end is positioned at said open side, means pivotally mounting said receiver to said compartment wall for pivoting between said horizontal position and said vertical position wherein said open end faces downwardly, means yieldably urging said receiver to said horizontal position;
   movable means for selectively conveying an article from a compartment to said receiver;
   an indexable rotary conveyor having a plural article retainer assembly for successively receiving a plurality of articles from said receiver, each index position of said rotary conveyor having one article retainer under said article receiver;
   reciprocating work means movable through said retainer assembly for selectively removing an article from said retainer assembly to a work position below said retainer assembly;
   driving means connected to both said rotary conveyor and said work means for synchronizing the operation thereof; and
   exit means receiving said article from said rotary conveyor including means for receiving said article moving in the first direction, means pivoting about an axis parallel to said first direction for moving said article in a direction transverse thereto.

2. Article conveying apparatus set forth in claim 1 further including an upwardly facing concave-arcuate ramp extending from said open side downwardly toward said conveyor and in immediate juxtaposition to said pivotable article receiver open end such that as said article receiver pivots downwardly, any article in said receiver is held therein by sliding engagement with said upwardly concave-arcuate ramp.

3. Article conveying apparatus set forth in claim 2 further including an upstanding circular cylindrical center post coaxially disposed with respect to said indexable rotary conveyor;
   means indexably rotating said conveyor in a first rotational sense;
   said retainer assembly including circular cylindrical article receiving portions, each with a radially inward opening exposing said center post to any article within said retainer assembly;
   resiliently biased guide arms movably disposed in juxtaposition to a work position of said indexable rotary conveyor and including a pair of spaced-apart article engaging surfaces disposed with respect to a center one of said radially inward apertures for moving an article in said work position contained within one of said retainer assemblies to a precise location determined by said two article engaging surfaces and said center post such that said reciprocating work means is precisely coaxially aligned with an article in said work position; and
   means coordinating operation of said reciprocating work means with said indexable rotary conveyor position.

4. Article conveying apparatus set forth in claim 3 including a unidirectional rotatable motor having an axis of rotation transverse to the axis of rotation of said indexable rotatable conveyor and being disposed in juxtaposition thereto;
   said conveyor indexing means including a gear-cam assembly interposed between said undirectional motor and said indexable conveyor for translating said undirectional motor rotation into indexing conveyor motions.

5. Article conveying apparatus set forth in claim 3 for handling axially elongated circular cylindrical articles having a tubular outer shell removable from an inner portion, further including in combination:
   a bottom plate disposed under said indexable rotatable conveyor generally transverse to the axis of rotation of said conveyor at least under an input position and adjacent said work position and having an aperture precisely coaxially aligned with said reciprocating work means with an annular lip for engaging said tubular cover whereby said reciprocating work means moving through said retainer assembly removes said inner portion from said tubular cover, while said tubular cover rests on said annular lip.

6. Apparatus set forth in claim 1 further including:

a frame;

a vertical shaft journalled for rotation on said frame;

said indexable rotary conveyor mounted on said vertical shaft for rotation therewith and being indexable to $k$ positions, $k$ being an integer;

said article receiver being juxtaposed and substantially parallel to said vertcial shaft when in said vertical position;

means releasably holding said article receiver in said vertical position;

a kick member on said vertical shaft adjacent said vertical position and having $k$ radially outwardly extending arms for engaging said article receiver to release same from said vertical position as said vertical shaft rotates; and means returning said article receiver to said horizontal position only after said release.

* * * * *